J. MERRITT & W. H. HONISS.
MACHINE FOR CUTTING RINGS.
APPLICATION FILED FEB. 14, 1907.

1,086,606.

Patented Feb. 10, 1914.
6 SHEETS—SHEET 4.

Witnesses:
Janette S. Ellsworth
H. Mallner

Inventors:
Joseph Merritt
William H. Honiss
By W H Honiss, Atty

J. MERRITT & W. H. HONISS.
MACHINE FOR CUTTING RINGS.
APPLICATION FILED FEB. 14, 1907.

1,086,606.

Patented Feb. 10, 1914.
6 SHEETS—SHEET 6.

Witnesses:

Inventors:
Joseph Merritt
William H. Honiss
By W. H. Honiss, Att'y

UNITED STATES PATENT OFFICE.

JOSEPH MERRITT AND WILLIAM H. HONISS, OF HARTFORD, CONNECTICUT, ASSIGNORS, BY DIRECT AND MESNE ASSIGNMENTS, OF ONE-FOURTH TO WILLIAM A. LORENZ AND ONE-FOURTH TO WILLIAM H. HONISS, BOTH OF HARTFORD, CONNECTICUT, AND ONE-HALF TO BEECH-NUT PACKING COMPANY, OF CANAJOHARIE, NEW YORK, A CORPORATION OF NEW YORK.

MACHINE FOR CUTTING RINGS.

1,086,606.   Specification of Letters Patent.   Patented Feb. 10, 1914.

Application filed February 14, 1907. Serial No. 357,427.

*To all whom it may concern:*

Be it known that we, JOSEPH MERRITT and WILLIAM H. HONISS, citizens of the United States, and residents of Hartford, in the county of Hartford and State of Connecticut, have invented certain new and useful Improvements in Machines for Cutting Rings, of which the following is a full, clear, and exact specification.
This invention relates to machines for cutting circular packing rings, or gaskets, as they are commonly termed, from cylindrical tubing.

The embodiment of this invention herein shown and described is a machine adapted for cutting ring gaskets like those shown and described in U. S. Patent 826,104 of July 17, 1906, having inclined edges and intended for use in the closure joints of hermetically sealed jars and other receptacles.

In Fig. 1 the various slides and swivels of the cutter head are shown in proper working angular relation to the tube;
but in Fig. 2 these parts are for convenience and simplicity of drawing, shown to stand squarely to the longitudinal center of the machine.
Figs. 11, 12, 13, 14 and 15 are fragmentary views showing the details of the clutch feed, stop, and interlocking mechanisms.
Fig. 11 is a front view in section taken on the line 11—11 of Fig. 10.
Fig. 12 is an end view in section taken on the line 12—12 of Fig. 7.
Fig. 13 is an end view in section taken on the line 13—13 of Fig. 7, showing the single position clutch for driving the feed mechanism forwardly.
Fig. 14 is an end view and Fig. 15 is a front view of the single position stop or lock for stopping the feed mechanism at the "out" position of the cutter.
Fig. 16 is a plan view showing the cutter spindle carrying frame swung over to its inner position, which may sometimes be convenient when cutting rings from tubes of small diameter, especially when the angle of the cut requires the cutter spindle to occupy a more nearly parallel relation to the tube.

The arrows placed adjacent to the several lines which indicate the plane in which the several different sectional views are taken show the direction in which the respective sections are viewed.

A brief statement of the purpose and functions of the machine will be found useful as a preface to the detailed description of its construction and mode of operation.

Figures 2, 17:
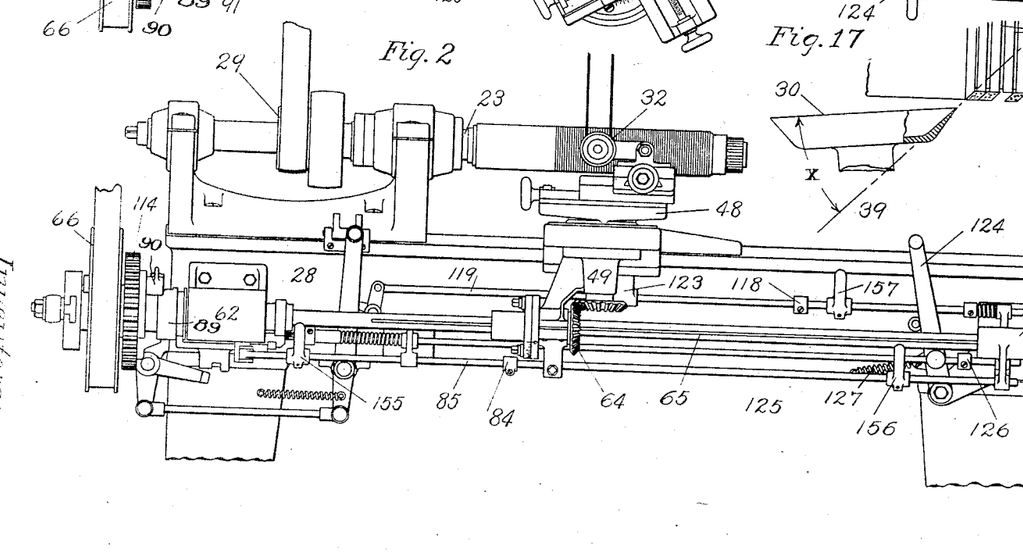
Fig. 2 is a front elevation of the machine shown in operation upon a tube, a considerable portion of which is shown to be already cut into rings, the separating cuts of which are indicated by the transverse lines.
Fig. 17 is a fragmentary plan view showing the relation of the cutter to its direction of feed and to the angular line of severance of the gasket rings.
Figures 3, 4, 5:
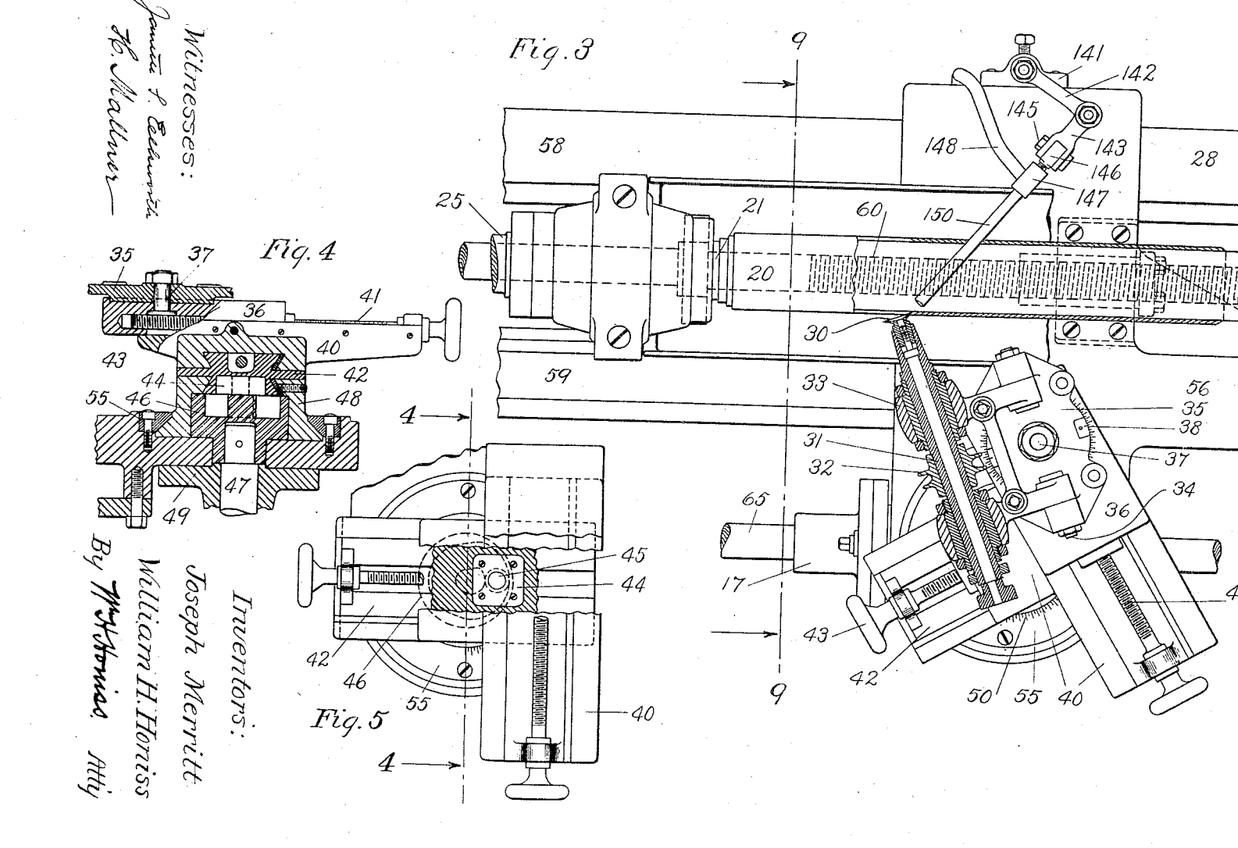
Fig. 3 is a plan view in enlarged scale of the central portion of the machine, including the mandrel and cutter carriage parts.
Fig. 4 is an end view in section taken on the line 4—4 of Fig. 5, of the cutter head portion of the carriage.
Fig. 5 is a plan view of the parts shown in Fig. 4, portions of the slides being broken away to show the cam mechanism more clearly.

The cylindrical tubes of rubber are stretched or otherwise mounted upon a rotating mandrel. The cutter herein shown for the cutting of rubber and similar material, has a thin sharp annular blade, and is rotated at a high rate of speed, by means of a cutter spindle mounted upon a cutter head supported by a carriage, by means of which the disk cutter is presented at a proper angle to the wall of the tube and is carried by an intermittent movement longitudinally of the tube, stopping at each intermission to allow the cutter to penetrate the wall of the tube at the required angle, and thus severing the successive rings as shown in Fig. 17. The alternate and intermittent feeding and cutting movements of the cutter, severing a ring for each forward step, are continued automatically the entire length of the tube, at which point the feeding and cutting movements are automatically stopped with the cutter in its outer position, clear of the tube. At this point the operator moves a reversing lever, throwing in the reversing mechanism which rapidly runs the carriage, with the cutter still in its outer position clear of the tube, back to the right hand end of the mandrel, in position for beginning a new cut. This reverse movement is stopped automatically at the proper point. The cut tube is removed, a new tube is substituted, and the operator, by means of another lever, starts forward the feeding and cutting mechanism again into operation, proceeding automatically as above described to the end of the tube, and so on. Interlocking devices are provided which serve to prevent interference of the several functions with each other; as for example, to lock the feeding mechanism out of operation during the return movement of the carriage, and vice versa.

The tube 20 of rubber or other suitable material from which the gaskets are to be cut is mounted upon a work-supporting spindle or mandrel 21 of suitable size, preferably larger than the interior of the tube, the latter being preferably stretched over the mandrel so as to hold itself thereto by constrictive action. To facilitate the ready removal and replacing of the tubes the mandrel preferably consists of a shell 22 removably mounted upon an arbor 23 supported by the spindle 25 which is journaled in the spindle head 26 resting upon the bed 28, the spindle being driven by a driving pulley 29. The arbor 23 is also preferably made removable from the spindle to enable mandrels of different sizes and lengths to be used, suitable for various sizes of tubes. Any convenient means, as a nut 24, may be employed for holding the shells upon the arbor. The shells 22 herein shown are assumed to be made of metal; and to avoid dulling the cutter by contact with the surface of the shells the latter are provided with annular grooves 19 for receiving the edge of the cutter, as the latter cuts through the wall of the tube in severing the successive gaskets. Hence these grooves are arranged in a pitch or spacing agreeing with that of the gaskets to be cut. Different shells provided with suitably spaced grooves are employed for cutting gaskets of differing width.

Figure 1:
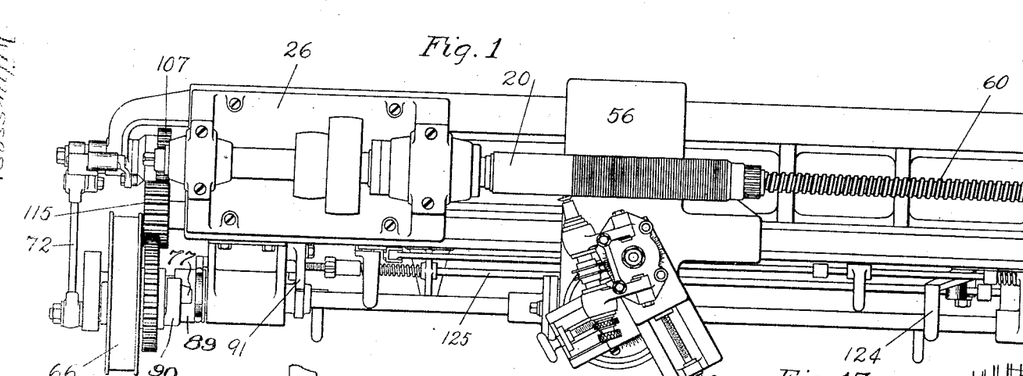
Figure 1 of the drawings is a plan view.

The cutting mechanism of the machine is mounted upon a carriage 56, mounted for sliding movement on the ways 58 and 59 of the bed 28, being moved upon the said ways longitudinally of the tube by means of any suitable actuator, such as the feed screw 60. The cutter head is mounted upon the carriage and is composed of slides and swiveling parts for effecting the various operating movements and adjustments required for making gaskets of different size and angles. The rotary cutter 30 preferably employed in this machine is of a dished form provided with an annular cutting blade inclined to its axis of rotation and is shown in its preferred form in Fig. 17. For convenience in sharpening, renewal and replacing with other cutters of various diameters, it is detachably mounted upon the spindle 31. This spindle, rotated at a high rate of speed by means of a belt on the pulley 32, is carried in arms of the cutter head frame 33 hinged by pins 34 to plate 35 by means of which it may be swung 180 degrees on a horizontal axis, from its position shown in Fig. 1 to that shown in Fig. 16, thus giving, in connection with the other adjustable parts of the cutter head, an extended range of adjustment to suit different sizes of tubes and different angles of cut. The plate 35 swivels on the stud 37, secured in the upper slide 36, which in this respect serves as a base for the swiveling plate 35. This swiveling movement of the plate is to enable the inclined blade of the cutter to be adjusted into alinement with the direction of its cutting movement, through the wall of the tube (Fig. 17). To enable this swiveling adjustment of the cutter to be made accurately, without experiment, the plate 35 and its supporting slide-base 36 are provided with graduations 38. These graduations may be adapted to indicate in degrees the angle of inclination of the cutting blade, relative to its axis of rotation. For practical considerations, however, the graduation is preferably made to show the complement of that angle; or in other words, the angle X indicated in Fig. 17 between the plane of rotation of the edge of the cutter and the inner face of the inclined cutting blade, that being the face which is preferably brought into coincidence with the line 39 of penetration through the wall of the tube and between the gaskets. The angle X shown in Fig. 17 is approximately 40 degrees. Hence for using that cutter the swivel plate 35 is set to 40 degrees as indicated by the graduation.

The slide 36 is mounted upon the slide 40, which is mounted upon the main slide 42. The latter slide is mounted upon the base 48 which is mounted upon the carriage 56 for swiveling movement about a vertical axis to enable the direction of cutting movement to be adjusted to the desired angle relative to the tube. The main slide 42 is reciprocated transversely to the axis by means to be described later, while the desired adjustments of the cutter relative to that axis are effected by the slides 36 and 40 and swiveling plate 35 above the slide 42. The slide 40 operated by the screw 43 adjusts the cutter mechanism in a direction coincident with the cutting movement to regulate the depth of cut, while the slide 36 transversely mounted upon the slide 40 and operated by the screw 41 effects the adjustments of the cutter transversely to the direction of cutting movement, to enable the cutter to be readily adjusted to register with the grooves 19 of the shells.

To facilitate the adjustment of the cutter head upon its vertical axis to bring the position of the main slide 42 to the angular position upon the carriage required for cutting the gasket at the required angle, the adjacent surfaces of the swivel base 48 and the swivel ring 55 are provided with graduations 50, by means of which the cutting mechanism may at once be set to the angle of the gasket to be made. When set to the desired angle the swivel base is clamped fast to the carriage by means of the bolt 54 which tightens a portion of the swivel ring 55 upon the base.

From the foregoing it will be understood that the two swinging adjustments of the swivel base 48 upon the carriage and the swivel plate or bracket 35 upon the slide 36 are for entirely different purposes. The adjustment of the swivel base 48 determines the direction of the reciprocating movement of the cutter, while the adjustment of the swivel plate 35 is used to bring the inclined blade of the cutter into coincidence with the line of cutting movement. Therefore the lower swiveling adjustment is employed only when changing the angle of the gasket to be cut, while the upper swiveling adjustment is employed only when the angle of the cutter is changed.

The driving mechanism for imparting reciprocating cutting movement to the cutter will now be described.

The main slide 42 is provided with a cam pin or roll 45 preferably secured to the slide by means of a block 44 and engaging with the cam 46 carried by the vertical driving shaft 47, which is journaled concentrically with the vertical axis of swinging movement of the swivel 48, preferably in a bracket 49.

The cam shaft 47 is connected with the splined driving shaft 65 by means of beveled gears 63 and 64 (Fig. 6), the former being fixed to the shaft 47, while the latter, loosely mounted upon the shaft 65 is journaled in the bracket 49, by which the gear is carried along the shaft, with the sliding movements of the carriage 56.

The rotary driving connection between the gear 64 and the shaft 65 is made by means of a flanged coupling 17 which is splined upon the shaft and is bolted to a flange 18 of the gear, to permit of rotary adjustment between that gear and the shaft, so as to adjust the cam 46 into proper time relation to the slide 42 and to readjust it whenever changes are made in the angular position of that slide upon the carriage. For example, if the swivel base is swung 10 degrees the cam 46 must also be swung 10 degrees in the same direction to preserve the proper time relation between the feed mechanism and the cutting mechanism. To facilitate making this adjustment the abutting surfaces of the coupling 17 and the flange 18 of the gear are provided with graduations, preferably corresponding with the graduations 50 of the swivel base, so that the same angular adjustments may be easily made in both with certainty and accuracy. The bolt holes, in the flange or in the coupling are elongated to permit of their required relative movement.

The shaft 65 is journaled in the brackets 62 and 53 and has fixed upon its left hand end the crank disk 68, from which driving movement is imparted to the feed screw 60, in proper time relation to the operation of the cutting mechanism. The shaft 65 is driven during the cutting and feeding operations by the pulley 66, which is journaled upon the bushing 61 of the bracket 62. Its driving connection with the shaft 65 is effected and controlled by clutch mechanism, which includes a pawl 67, mounted upon the pulley 66 and yieldingly held by a spring 3 into engagement with a shoulder 4 of the crank disk 68.

Figure 6:
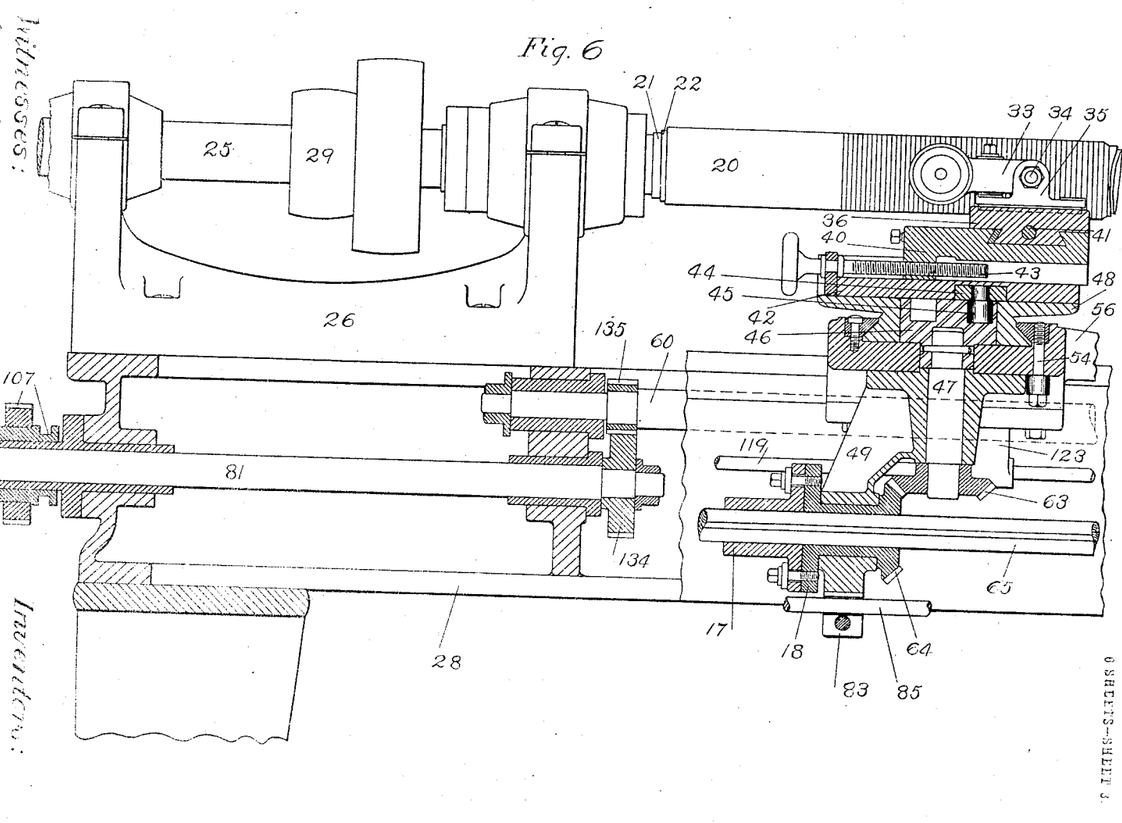
Fig. 6 is a front elevation of the carriage and head end of the machine, the carriage being shown in section taken on the line 6—6 of Fig. 9, while at the left hand end of the bed of the machine is taken in section on the line 6—6 of Fig. 12, in the plane of the feed screw and its driving ratchet shaft. In this view, as in Fig. 2, the cutter head parts are assumed to be turned parallel with and at right angles to the longitudinal center of the machine.
Figures 11, 12, 13, 14, 15, 16:
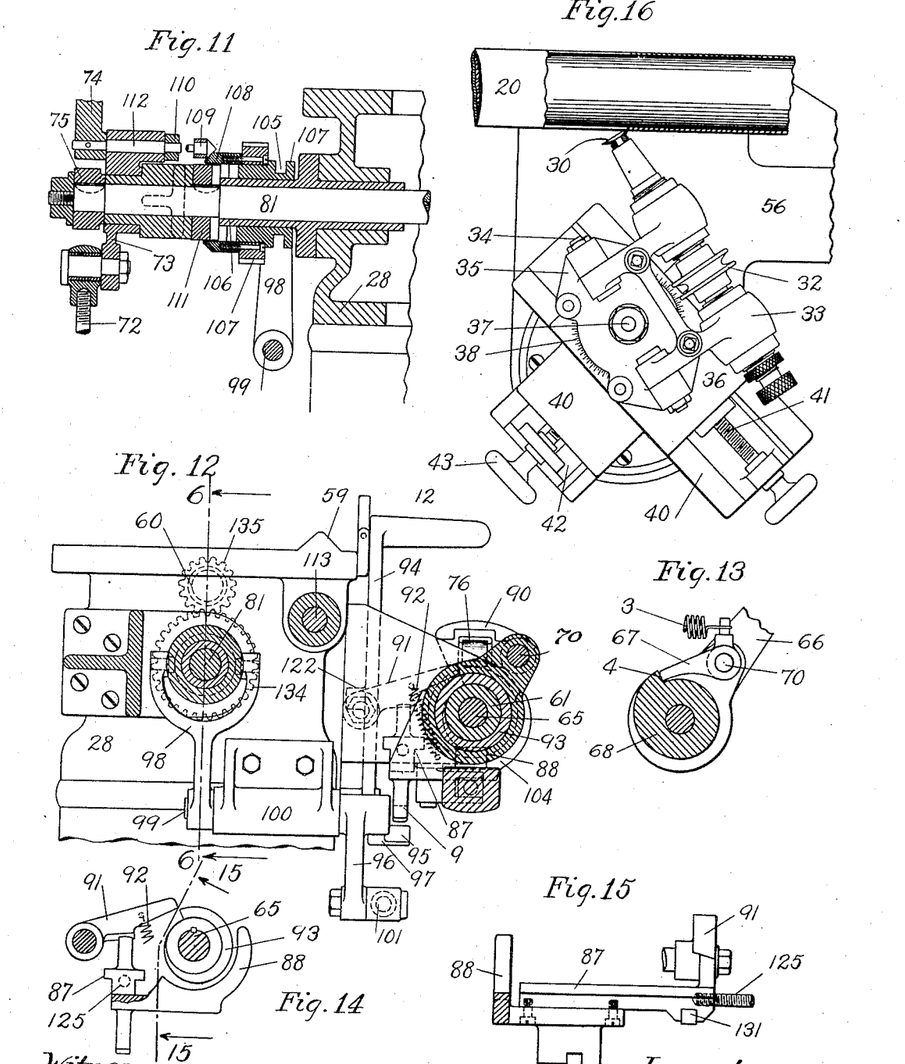

The crank disk 68 is provided with a T-slot, to receive a sliding crank pin 71, to which is pivoted one end of the connecting rod 72, the other end being pivoted to the rocker arm 73, the upper portion of which carries the feed pawl 74 engaging the ratchet 75, which is fixed upon the feed shaft 81, which is journaled in the bed of the machine, and is connected with the feed screw 60 by means of gears 134 and 135 (Figs. 6 and 11). The ratchet 75 may be interchanged with others having a less or greater number of teeth, suited to the pitch or width of the gaskets to be cut. The crank pin 71 is adjustable in its T-slot in the crank disk 68, to enable the stroke of the rocker arm to be regulated to suit the amount of advancing movement to be imparted through the feed shaft 81 to the feed screw 60. The crank disk is provided with graduations 80 to facilitate adjusting the crank pin, so as to impart the length of stroke required for the different widths of gaskets. As previously explained, the feed or advancing movements of the feed screw and carriage are imparted while the cutter mechanism is at rest in its backward or retractive position, that mechanism performing its cutting operation upon the tube to sever a gasket during the intermission in the feeding movement, while the rocker arm 73 is being moved back to carry the feed pawl 74 into engaging relation to its succeeding tooth of the ratchet. These intermittent advancing movements of the carriage, alternating with the operations of the cutting mechanism, continue until the cutter reaches the end of the tube. Then the feeding and cutting operations are automatically stopped by knock-off devices which operate the clutch mechanism, raising the driving pawl 67 of the driving pulley 66 out of driving engagement with the crank disk 68. Provision is made for invariably stopping the feed mechanism in its retracted position, with the cutter clear of the tube, as shown in Fig. 17; and with the crank pin 71 and rocker arm 73 in their retracted positions, shown in Fig. 10.

Figure 7:
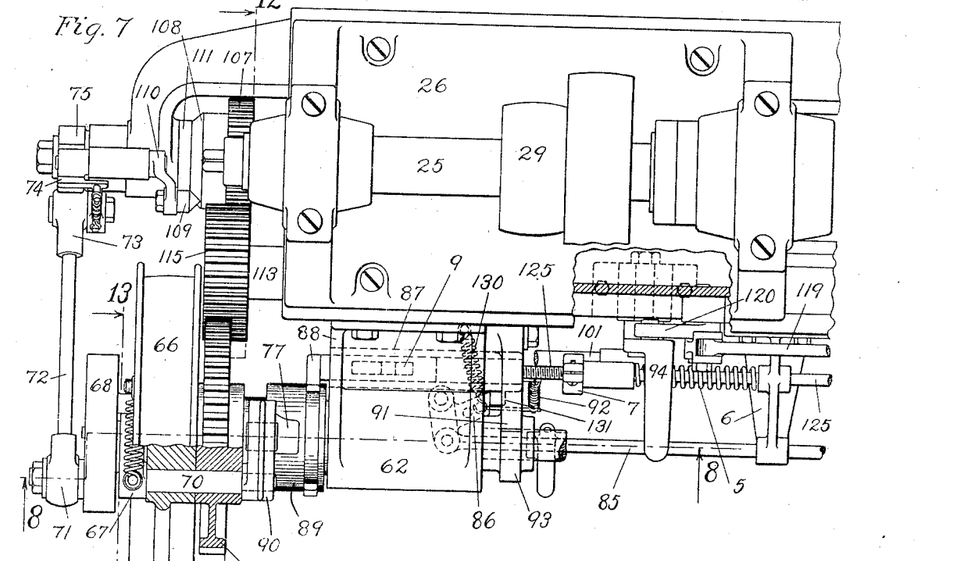
Fig. 7 is a plan view of the left hand end of the machine, some portions of which are slightly broken away
to show the inner mechanism more plainly.
Figure 8:
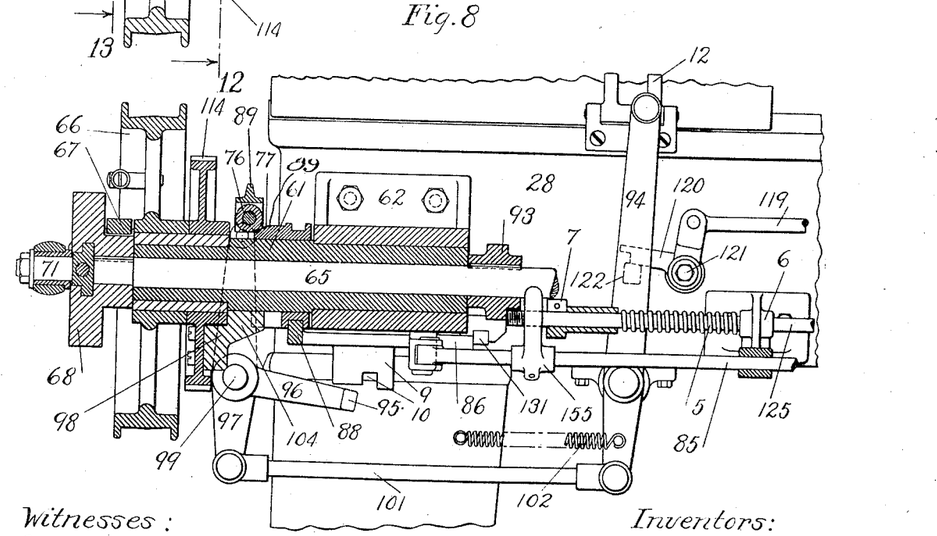
Fig. 8 is a front elevation of a portion of what is shown in Fig. 7, in section taken on the line 8—8 of Fig. 7.

The driving pawl 67 is journaled by means of the shaft 70 in the pulley 66 (Fig. 7) the other end of the shaft having fixed thereon the arm 90, which engages with the inclined surface 77 of the shipper cam 89, preferably by means of a roll 76 (Figs. 8 and 12). The shipper cam 89 is mounted loosely upon the bushing 61 upon which it is rotated with the pulley 66, by means of a driving arm or dog 104, appurtenant to the reversing gear 114, which is fixed to or integral with the pulley 66. The object of rotating this shipper cam 89 with the pulley is to carry the inclined surface 77 in register with the roll 76. But obviously this is not essential, since the inclination may extend entirely around the periphery of the cam 89, in which case no provision need be made for rotating it in register with the pawl arm 90. To lift the pawl out of driving engagement, the shipper cam 89 is moved toward the left, by means of the shipper 88 (Figs. 7, 12, 14 and 15), appurtenant to the shipper slide 87, which is mounted for longitudinal sliding movement in the bracket 62; and is provided at its right hand end with the shipper rod 125 which extends lengthwise of the bed of the machine, being supported in suitable brackets. A spring 5 extending between the bracket 6 and the adjustable nut 7 presses the shipper 88 toward the left, thereby tending to lift the latch 67 and disconnect it from the crank disk, the adjustment of the nut 7 enabling the tension of the spring 5 to be varied to the required extent. At the right hand end of the machine or at any other convenient portion thereof a starting lever 124 engages with a collar 126, on the shipper rod 125, by means of which that rod and its connected shipper cam 89 are moved to the right, to allow the driving pawl 67 to drop into engagement thereby starting the feed and cutting mechanisms into operation. The shipper and its rod are held in this running position by means of a latch 86 which is pivoted on the bracket 62, and is yieldingly held in the position shown in Fig. 7 behind the locking piece 131 of the slide 87 by means of the spring 130. The arm of the latch 86 is connected with a knock-off rod 85, which extends the length of the machine, and is provided with an adjustable collar 84, with which the lower portion 83 of the bracket 49 collides, when the carriage reaches the prescribed limit of its advancing movement, the last portion of which operates through the rod 85 to withdraw the latch 86 from the shipper slide 87, thus releasing the latter and permitting the spring 5 to move the shipper cam 89 to the left; and thus lift the driving pawl 67 out of driving engagement. The knock-off rod 85 is also provided with handles 155 and 156 disposed at positions from which it may be desirable to stop the machine by hand. The starting lever 124 is preferably provided with a spring 127, which retracts the lever away from the collar 126, so that the spring 5 when released by the latch 86 does not have to overcome the inertia of the lever 124; and therefore can operate the knock-off more quickly and uniformly.

To insure the positive stopping of the spline shaft with the cutter in its retracted position and positively prevent any movement of the cutter toward the tube during the return of the carriage, we have provided the latch 91 journaled in the bracket 62. When the knock-off slide 87 is released and moves to the left it rides out from under the lower beveled face of the latch which by action of the spring 92 drops into engagement with the shoulder of the stop collar 93 keyed upon the spline shaft. Having thus stopped the advancing or feeding movement of the carriage, the latter may now be reversed to return it, preferably by a continuous and faster movement, to its initial position, ready for operation upon a new tube, by the reversing mechanism which is best shown in Figs. 6, 7, 10, 11 and 12. The ratchet shaft 81, which is connected with the feed screw 60 by means of the gears 134, 135 (Figs. 6 and 12) has fixed near its left hand end the clutch disk 111, which is adapted to engage with the reversing clutch gear 107, which is mounted for rotary and endwise movement on the bushing 106. The rotary reversing movement of the gear 107 is imparted by the reversing gear 114, which is attached to or integral with the driving pulley 66, and connects with the reverse clutch gear 107 through the intermediate gear 115, which is mounted on the stud 113, thus rotating the gear 107 continuously in a direction suitable for reversing the movement of the feed screw 60 and its carriage 56. In addition to its reversing clutch pins or dogs the gear 107 is provided with a pawl cam 108, which as the reversing clutch gear is moved to the left engages with the cam roll 109 appurtenant to the pawl arm 110 fixed on the stud 112, which is journaled in the ratchet rocker 73, and has fixed upon its other end the ratchet pawl 74. The parts are so proportioned and arranged that the endwise movement of the pawl cam 108 first lifts the pawl 74 out of engagement with the teeth of the ratchet 75, and then by a continuing endwise movement comes into locking engagement with the clutch disk 111. While thus engaged the reversing movement is communicated to the carriage 56, which is continued until the latter is returned to its initial position, whereupon the clutch gear 107 is moved to the right, back to the position shown in Fig. 11, thereby disconnecting it from the clutch disk 111 and stopping the reversing movement; and at the same time dropping the ratchet pawl 74 into engagement with its ratchet 75, thus restoring the connection between the pawl and its ratchet ready for the next advancing movement of the carriage.

The endwise movement of the reversing clutch gear 107 is effected by means of the clutch lever 98, which is fixed upon the shaft 99 journaled in the bracket 100, the upper forked end of the arm engaging with the groove 105 of the reversing clutch gear 107. The opposite end of the shaft 99 has fixed upon it the reversing arm 97, which is connected by means of the rod 101 with the reversing lever 94, which is pivotally mounted upon the bed and is provided with a spring 102 tending to hold the lever and its associated parts in their inoperative position shown in Figs. 8 and 11. The top of the lever 94 is moved to the left by the operator, to throw the reversing mechanism into operation; and is latched in its reversing position by means of the latch 120, mounted on the stud 121, and engaging with a suitable catch or shoulder 122 on the reversing lever 94. The latch 120 is provided with a knock-off rod 119, which extends lengthwise of the bed, supported in suitable brackets, and is provided with an adjustable collar 118, with which a projecting arm 123 of the carriage collides, as the carriage approaches the end of its reversing movement, the latter portion of which operates by moving the collar 118 and its knock-off rod 119 to the right to lift the latch 120 and release the reversing lever therefrom, whereupon the latter is moved by the spring 102 to the position shown in Fig. 8, thus disconnecting the reversing clutch gear 107, and permitting the carriage to stop. The knock-off rod is also preferably provided with a handle 157, by means of which the latch 120 may be tripped, so as to enable the reversing movement to be stopped by hand at any desired position, in addition to and independently of the automatic stopping action at the end of its movement.

The machine is provided with interlocking and stop devices coöperating with the clutch mechanism of the machine to prevent improper operation of the machine, which might otherwise occur through inadvertence or carelessness on the part of the operator. The clutch mechanism for effecting the forward and return movements of the carriage is interlocked by means of the lock arm 96 herein shown to be appurtenant to the reversing arm 97; and having a locking projection 95, which extends into the plane of movement of the stop block 9 appurtenant to the shipper slide 87 (Figs. 8, 12, 14 and 15). During the time that the shipper slide is drawn to the right to put the forward feed in operation, the portions of the stop block 9 overlie the projection 95 of the locking arm 96 and prevent the reversing mechanism from being moved far enough to throw the reversing gear 107 into clutch with the clutch disk 111, although the block 9 allows the reversing mechanism to be moved far enough to cause the pawl cam 108 to lift the pawl 74 out of driving engagement with its ratchet for a purpose to be later described. When, however, the shipper slide 87 is released from its latch 86 and is moved toward the left far enough to lift the driving pawl 67 out of forward driving engagement, the recess 10 of the stop block is carried over the top projection 95, whereupon the reversing mechanism may be operated, the projection 95 entering the recess 10; and thereby locking the shipper slide 87 out of operation. Thus these interlocking devices serve to prevent the forward driving and the reverse driving mechanisms from being put in operation at the same time.

It is found convenient, while adjusting the parts for operation, and particularly while adjusting the cutter to carry it to its proper depth, to operate the cutting mechanism of the cutter head without operating the feed mechanism, so that the cutter makes repeated cutting strokes, without advancing the carriage. To enable this to be done, in spite of the interlocking devices, and without impairing their utility, sufficient space is left between the stop block 9 and its coöperating stop projection 95 of the stop arm 96, to allow the reversing lever to be moved toward the left far enough so that the pawl cam 111 will lift the ratchet pawl 74 out of engagement with its ratchet, without bringing the reversing gear 107 and the clutch disk 108 into engagement with each other. In order to retain the parts in this position during the operation of setting the cutter, a latch 12 is provided, which is pivoted upon a fixed portion of the machine and is preferably forked so as to extend on opposite sides of the reversing lever 94 when turned down. With the lever in this position, holding the feed pawl 74 out of operation, the driving shaft 65 may be started by operating the starting lever 124, thus causing the cutter slide 42 to be moved back and forth through its normal stroke, without operating the feed shaft.

Figures 9, 10:
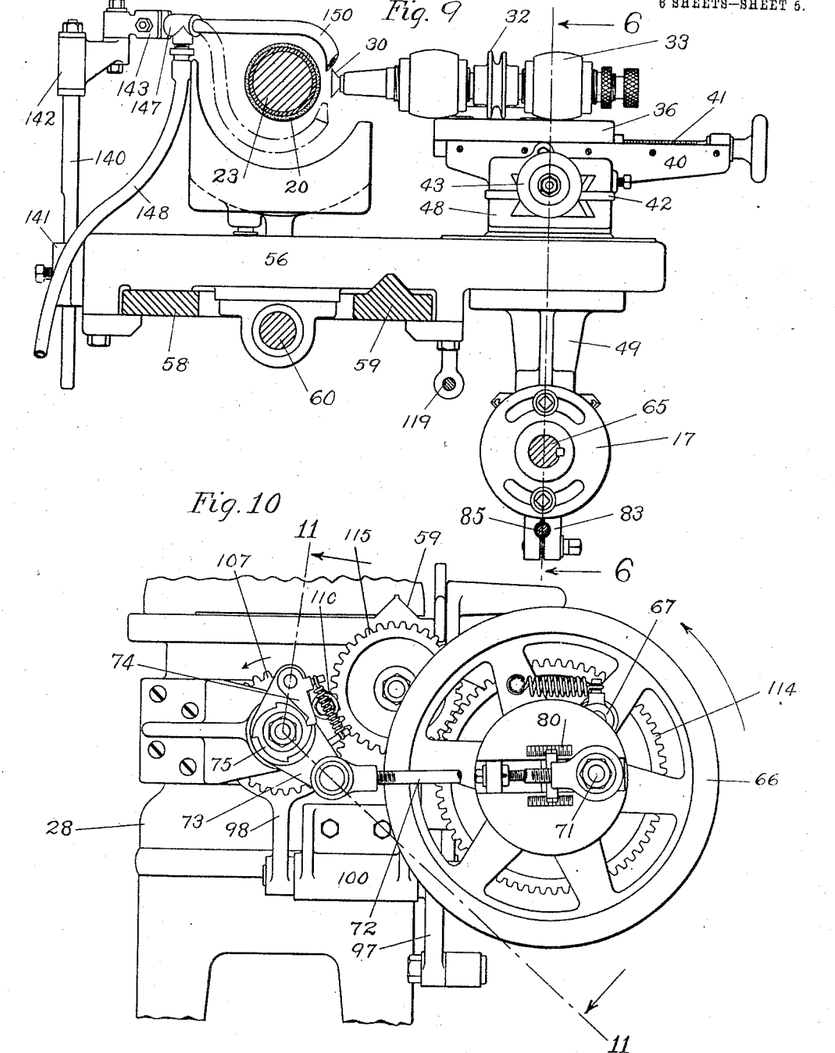
Fig. 9 is an end view of the carriage looking from the head or left hand end of the machine, a portion of the bed, screw, shafts, etc., being shown in section taken on the line 9—9 of Fig. 3. In this view the cutter head parts are shown in the same position as in Figs. 2 and 6.
Fig. 10 is an end view, looking from the head or left hand end of the machine of the feed and clutch mechanism.

It has been found to be advantageous to keep the rubber tube wet while being cut, and to accomplish this we have arranged a water feed device consisting of a supporting post 140 clamped in the bracket 141 upon the back of the carriage, and on the upper end of this post rests the arm 142 to which is pivotally connected the yoke 143 having hinged therein by stud 145 the yoke ring 146 threading into the T 147. To this T is attached the hose 148 supplying water by gravity from a reservoir or from a pump. To the other outlet of the T 147 is attached the nozzle 150, adjustable through hinge of yoke ring 146 or stud of yoke 143 and arm 142 to any angle, so that the water may be applied directly upon the cutting line of contact, as shown in Fig. 9, either from above as shown in full lines, or from below, as shown in dot-and-dash lines. The entire water feed device is also adjustable vertically in the bracket 141 to provide for any size of tube being cut.

The consecutive operation of the machine as a whole is as follows:—Power being applied to the different driving pulleys and the rubber tube to be cut being in place upon the mandrel and the cutter properly adjusted to its cutting position, the operator, first observing that the reversing lever 94 is in its right hand or inactive position shown in Fig. 2, moves the starting lever 124 to the right, therefore dropping the driving pawl 67 into engagement, thus starting the cutting and feed mechanisms into operation. These continue in alternate operation until the end of the tube is reached, whereupon the lower end 83 of the bracket strikes the knock-off collar 84, thereby withdrawing the latch 86 and allowing the shipper slide 87, its arm 88 and the cam 89 to be moved to the left by the spring 5, thus unclutching the forward driving mechanism by lifting the feed pawl 67 out of engagement and stopping the feed and cutting mechanisms. The movement of the shipper slide 87 to the left allows the stop latch 91 to engage with the stop collar 93, thus positively stopping the cutting mechanism in its retracted position, with the cutter clear of the tube, as shown in Fig. 17. The reversing arm 94 is then moved to the left, lifting the feed pawl 74 out of driving engagement with its ratchet 75, and clutching together the reversing gear 107 and the clutch disk 111, which rotates the screw rapidly in a reverse direction, thus moving the carriage back to the other end of the tube. During this time the reversing lever is held in its reversing position by means of the latch 120. Arriving at the end of the return movement the carriage collides with the knock-off collar 118 carrying with it the rod 119 and thus lifting the latch 120 and releasing the reversing lever 94 which then, under the impulse of the spring 102, is moved with its associated clutch mechanism back to the position shown in Figs. 2 and 8, disconnecting the reversing gear 107 and dropping the feed pawl 74 back into engagement with its ratchet 75. The carriage having come to rest, the cut gaskets are removed preferably by removing the shell upon which they are mounted. The cut gaskets are replaced by a new tube, and the feeding and cutting mechanisms are again started by means of the starting lever 124, as before.

The above order of operations may be varied to suit different conditions. For example, it may be found advantageous to remove the gasket shell while the carriage and cutter are at the left hand end of their feeding or advancing movement, so as to give the operator time to remove the cut gaskets from the shell and replace them with a new tube while the carriage is being returned to its starting position.

The size, form and inclination of cutter may and should be varied to suit different sizes of gaskets and different angles of cut, in order that they may be cut cleanly and conform sufficiently well to the annular extension of the cut. For some purposes it may be found sufficient or even preferable to use a non-rotating cutter, of a form suited to the cut to be made. The means for clamping, holding, or supporting the cutter should also be adapted by modification, if necessary, to suit the size or form or style of cutter employed.

Various other modifications may be made in the size, shape, position, and the direction of movement of the various parts of the machine, and equivalent mechanical devices may be substituted for effecting the desired movements. For example, the path of the cam 46 may be varied to alter the time of the cutting mechanism. In some cases crank mechanism may be substituted for cam mechanism and the movements characteristic of the crank may be modified in ways well known to those skilled in this art. In any other ways which will occur to mechanics familiar with this art, the invention herein shown may be modified to suit different requirements or conditions.

We claim as our invention:—

1. The combination of a rotary cutter having an annular cutting blade inclined to its axis of rotation, and a movable carriage upon which the cutter is mounted for rotary and reciprocating movement, provided with a swivel for adjusting the inclination of the blade of the cutter in accordance with the direction of reciprocating movement.

2. The combination of a rotary cutter having an annular cutting blade inclined to its axis of rotation, carriage mechanism for moving the cutter into its cut, and for moving the cutter from one to the other of its successive cuts, including a swivel device for adjusting the inclined blade of the cutter into coincidence with the direction of its cutting movement.

3. The combination of a rotary cutter having an annular cutting blade inclined to its axis of rotation, a slide for imparting the cutting movement, a carriage for moving the cutter from one to the other of its successive cuts, and a swiveling bracket for adjusting the inclined blade of the cutter in accordance with its direction of cut.

4. The combination with a work-carrying spindle, of a work cutter, and means for moving the cutter longitudinally of and also transversely to the work, comprising a cutter-supporting frame, a carriage mounted for movement in one direction, and supporting the cutter-carrying frame for movement in variable angular positions, and means for effecting the carriage and cutter frame movements in predetermined relation to each other.

5. The combination of a work-carrying spindle, a work cutter, and means for moving the cutter both longitudinally and transversely of the work, comprising a cutter-supporting frame, a carriage mounted for movement in one direction relative to the work, and supporting the said frame for movement in a different direction, means for changing the angular relation of the two said movements, and means for effecting the said movements in prescribed time relation to each other.

6. The combination of a work-carrying spindle, a work cutter, means for moving the cutter longitudinally of the work, and also in different directions variable in their angular relation to the work, comprising a cutter-supporting frame, a carriage movable longitudinally of the work and supporting the said frame for movement in a different direction relative to the work, means for varying the angular relation of the two said movements to each other, and means for effecting the two said movements in a prescribed time relation to each other.

7. The combination of a work support, a work cutter, a carriage, a head mounted for swinging movement upon the carriage and supporting the cutter for movement relative to the head, means for moving the carriage, and means situated approximately concentric with the center of swing of the head for moving the said cutter relative to the head.

8. The combination of a work support, a work cutter, a carriage, a cutter head mounted for swinging movement upon the said carriage and supporting the said cutter for movement transverse to the work, means for moving the carriage, and means including a driving member situated substantially concentric with the axis of swing of the head, for moving the said cutter transversely toward and from the work.

9. The combination of a work support, a cutter-supporting frame, a carriage, a cutter head mounted for swinging movement on said carriage, and supporting the said cutter frame for movement relative to the head, means for moving the carriage, and means including a driving member situated approximately concentric with the axis of the swinging head for moving the said cutter frame relative to the head.

10. The combination of a work-carrying spindle, a work cutter, a carriage, a cutter head mounted for swinging movement on said carriage, and supporting the said cutter for movement relative to the head, means for adjusting the position of the cutter in varying relations to the journal of the swinging head, and rotary means journaled in substantially concentric relation to the swinging head for moving the said cutter relative to the head.

11. The combination of a work spindle, a work cutter, a carriage, a cutter head mounted for swinging movement on the carriage, and supporting the cutter for movement relative to the said head, means for adjusting the position of the cutter relative to the center of swing of the head, and means journaled concentrically with the swinging movement of the said head for moving the cutter relative to the said head at the different positions to which the head may be swung.

12. The combination of a work spindle, a work cutter, a carriage, a cutter head provided with a swiveling base mounted upon the carriage, slides supported by the head for adjusting the position of the cutter relative to the base of the head, and means extending through the said base for operating one of said slides to move the cutter relative to the base at the different swiveling positions of the head.

13. The combination of a work spindle, a work cutter, a carriage, a cutter head mounted upon the carriage for swinging movement upon a vertical axis and provided with slides supported for movement transverse to each other and supporting the cutter for rotation, means for moving the carriage, and means for moving the said slides to reciprocate the cutter in a direction different from that of the movement of the carriage.

14. The combination of a work spindle, a work cutter, a carriage, a cutter head mounted upon the carriage for swinging movement upon a vertical axis and provided with a slide supporting the said cutter, and means mounted in substantially concentric relation with the said axis of the head for reciprocating the said slide and its cutter relative to the head.

15. The combination of a work spindle, a work cutter, a carriage, a cutter head mounted upon the carriage for swinging movement upon a vertical axis, a slide supporting the cutter, and mounted for longitudinal movement upon the head, and a cam journaled concentrically with the said axis of the head for moving the said slide relative to the head.

16. The combination of a work spindle, a work cutter, a carriage, a cutter head mounted upon the carriage for swinging adjustment on a vertical axis, a cutter support mounted for sliding movement on the head, driving means journaled concentrically with the axis of the head for moving the cutter support transversely of the axis, and means for adjusting the said driving means in accordance with the swinging adjustment of the head.

17. The combination of a work spindle, a work cutter, a carriage, a cutter head mounted upon the carriage for swinging adjustment about a vertical axis, a cutter support mounted for movement transverse to the said axis, means journaled concentrically with the said axis for imparting the transverse movement of the slide, means for fastening the head in different adjusted positions, an index for showing the angular position of the said head, and means for adjusting the cutter support operating means in accordance with the angular position of the head.

18. The combination of a work spindle, a work cutter, a carriage mounted for movement in a direction substantially parallel with the work spindle, a cutter head mounted upon the carriage for swinging movement upon an axis disposed at right angles to the direction of movement of the carriage, a cutter support mounted upon the cutter head for movement transverse to the said axis, driving means carried by the said head for moving the said cutter support, a driving shaft journaled in a parallel relation to the direction of movement of the carriage, and gearing connecting said shaft with said driving means for the cutter support.

19. The combination of a driving shaft, a cutter carriage mounted for movement longitudinally of the shaft, a cutter head mounted upon the carriage for swinging adjustment upon an axis disposed at an angle to the shaft, and provided with a cutter support mounted for sliding movement in a direction transverse to the said axis, means journaled in concentric relation to the said axis for effecting the said sliding movement, and means including a plurality of slides mounted in transverse relation to each other for adjusting the cutter support relative to the said axis.

20. The combination of a driving shaft, a carriage, a cutter head mounted upon the carriage for angular adjustment about a vertical axis, and provided with a cutter support mounted for movement transverse to the said axis, and driving means journaled in concentric relation to the said axis and operatively connected with the said driving shaft.

21. The combination of a driving shaft, a carriage, a cutter head mounted on said carriage for angular adjustment about an axis situated at an angle relative to the driving shaft, provided with a cutter support mounted for transverse movement relative to the said axis, means journaled in concentric relation to the axis of the head, and operatively connected with the driving shaft for imparting the transverse movement of the cutter support, and means for adjusting the said connection in conformity with the different angular adjustments of the cutter head.

22. The combination of a driving shaft, a carriage mounted for movement in a direction parallel with the shaft, a cutter head mounted upon the carriage for swinging adjustment upon an axis disposed at an angular relation to the driving shaft, and provided with a cutter support mounted for movement in a direction transverse to said axis, means including a rotating shaft journaled in concentric relation to the axis of the head for moving the said cutter support, a toothed gear appurtenant to the shaft, a coacting gear, mounted concentrically with the driving shaft, and an adjustable connection between the said shaft and the said gear, to facilitate adjustment of the driving means into conformity with the angular adjustment of the cutter head.

23. The combination of a carriage, a cutter head mounted upon the carriage for swinging adjustment upon a vertical axis, and provided with a cutter supporting frame mounted for swinging movement upon a horizontal axis to facilitate adjusting the position of the cutter relative to the vertical axis.

24. The combination of a carriage, a cutter, a cutter head mounted upon the carriage for swinging adjustment upon a vertical axis and including a cutter slide mounted for movement transverse to the said axis, and a cutter-carrying frame supported by the slide for swinging movement upon a horizontal axis, to facilitate horizontal adjustment of the cutter relative to the vertical axis of the cutter head.

25. The combination with a rotary cutter provided with an annular cutting blade inclined to its axis of rotation, of a carriage, a cutter support mounted for transverse movement upon the carriage, and a frame supporting the cutter for rotation and mounted to swivel upon the said support, whereby the inclined blade of the cutter may be adjusted to suit the direction of movement of its support.

26. The combination with a rotary cutter having an annular cutting blade inclined to its axis of rotation, a carriage, a cutter slide mounted for movement on the carriage to carry the cutter toward and from its work, and a frame supporting the cutter for rotation and mounted for swiveling movement on the said slide whereby the inclined blade of the cutter may be adjusted to suit the direction of movement of the slide.

27. The combination with a rotary cutter having an annular cutting blade inclined to its axis of rotation, a carriage, a cutter head mounted upon the carriage for swiveling movement upon a vertical axis, provided with a cutter supporting slide mounted for movement transverse to said axis, and a bracket supporting the cutter for rotation and mounted for swiveling movement upon the said slide, whereby the inclined blade of the cutter may be adjusted to suit the direction of movement of the cutter slide.

28. The combination of a rotary cutter having an annular cutting blade inclined to its axis of rotation, a frame supporting the cutter for rotation, a slide supporting the said frame for swiveling movement, a carriage supporting the slide for sliding movement, and means for moving the slide relative to the carriage, all arranged and operating to move the cutter back and forth, and to facilitate adjustment of the desired portion of the cutter into substantial coincidence with its direction of movement.

29. The combination of a work spindle, a rotary cutter having an annular cutting blade inclined to its axis of rotation, a carriage mounted for movement longitudinally of the spindle, a cutter head mounted upon the carriage for swinging adjustment on a vertical axis, and provided with a cutter supporting slide mounted for transverse movement relative to the said axis, and means for mounting the cutter upon the slide with a swinging adjustment, to bring the inclination of its cutting blade into substantial accordance with the direction of movement of the cutter slide.

30. The combination with a rotary cutter having an annular cutting blade inclined to its axis of rotation, a frame supporting the cutter for rotation, carriage mechanism supporting the frame for swiveling movement, the frame and the said carriage mechanism being provided with graduations indicative of the angular position of the said axis of rotation, to facilitate adjustment of the inclined blade of the cutter into desired relation to the direction of movement of the carriage mechanism.

31. The combination of a rotary cutter having an annular cutting blade inclined to its axis of rotation, a frame supporting the cutter for rotation, carriage mechanism supporting the said frame for sliding and swiveling movement, and graduated means for indicating the angular relation of the cutter axis to the direction of sliding movement, to facilitate setting the inclined blade of the cutter into desired relation to the direction of the sliding movement.

32. The combination of a rotary cutter having an annular cutting blade inclined to its axis of rotation, a frame supporting the cutter for rotation, carriage mechanism, including members mounted for sliding and swiveling movement, and supporting the said frame for additional and independent swiveling movement, and graduated means for indicating the angular extent of the respective swiveling movements, to facilitate adjusting the carriage mechanism to different angles of sliding movement, and to adjust the inclined blade of the cutter into accordance with the said direction of movement.

33. The combination of a carriage, cutting mechanism, including a rotary cutter, mounted upon the carriage for movement in variable angular positions relative to the carriage, and means for advancing the carriage and operating the cutting mechanism in alternate succession.

34. The combination of a carriage, cutting mechanism, including a rotary cutter, mounted upon the carriage for movement in variable angular positions relative to the carriage, means including a screw for imparting feed movement to the carriage, means for operating the cutting mechanism, and means for operating the feed screw and cutting mechanism intermittently and in alternate succession.

35. The combination of a carriage, cutting mechanism mounted upon the carriage for movement in different angular positions relative to the carriage, means including a feed screw for advancing the carriage, means including a driving shaft for operating the feed mechanism intermittently, means operatively connected with the said driving shaft for turning the feed screw intermittently, a driving member having a clutch connection with the driving shaft, and means controlled by the carriage movement for automatically disconnecting the said clutch to stop the feed and cutting movements.

36. The combination of a carriage, cutting mechanism mounted upon the carriage for movement relative to the carriage, means including a feed screw for advancing the carriage, means including a driving shaft for operating the feed mechanism intermittently, a driving wheel having a single position clutch connection with the driving shaft, a stop device for the driving shaft, and means controlled by the movement of the carriage for moving the driving pawl out of driving engagement, and the stop into stopping engagement with the shaft.

37. The combination of a carriage, means including a feed screw for moving the carriage, clutch mechanism for driving the screw, means including a spring for disengaging the clutch to stop the screw, and means including a latch released by the carriage movement for holding the clutch mechanism in its driving position.

38. The combination of a carriage, a feed screw for moving the carriage, clutch mechanism for turning the screw, means including a spring for disconnecting the clutch mechanism, a latch for holding the clutch mechanism in its connected position for turning the screw, and adjustable means operable by the carriage for withdrawing the latch to stop the screw at different prescribed positions of the carriage.

39. In a gasket cutting machine, the combination of a carriage, rotary cutting mechanism mounted on the carriage, feed mechanism for moving the carriage, and automatic means controlled by the carriage, for stopping the cutting and feed mechanisms at prescribed positions.

40. In a gasket cutting machine, the combination of a carriage, rotary cutting mechanism mounted on the carriage, feed mechanism for advancing the carriage in prescribed time relation to the operation of the cutting mechanism, and means controlled by the carriage movement for interrupting the action of the feed mechanism, and stopping the cutting mechanism at prescribed and variable positions.

41. In a gasket cutting machine, the combination of a carriage, rotary cutting mechanism mounted on the carriage, means for advancing the carriage, means for operating the cutting mechanism in coöperation with the feeding means, and automatic means controlled by the carriage for arresting its advancing movement at a prescribed position, and for stopping the cutting mechanism in prescribed and variable positions relative to the carriage.

42. The combination of a work spindle, a carriage, means for advancing the carriage longitudinally of the spindle, cutting mechanism mounted on the carriage for transverse movement toward and from the work spindle, and means controlled by the carriage for interrupting the advancing movement of the carriage at a prescribed position, and stopping the cutting mechanism in its position farthest from the work spindle.

43. The combination of a work spindle, a carriage, means for feeding the carriage longitudinally of the spindle, cutting mechanism mounted on the carriage for movement toward and from the work spindle, a clutch device for driving the feed and cutting mechanism, and automatic means controlled by the movements of the carriage for disconnecting the clutch device to arrest the movements of the feed and cutting mechanisms at prescribed positions.

44. The combination of a work spindle, a carriage, means including a screw for feeding the carriage longitudinally of the work spindle, cutting mechanism mounted on the carriage for movement toward and from the work spindle, means including a driving shaft for driving the said cutting mechanism, clutch mechanism for driving the said screw and driving shaft, and means controlled by the carriage movement for operating the clutch mechanism to stop the screw and driving shaft at prescribed positions.

45. The combination of a work spindle, a carriage, means including a screw for feeding the carriage longitudinally of the spindle, cutting mechanism mounted upon the carriage for movement toward and from the spindle, a driving shaft for said cutting mechanism, clutch mechanism for the screw and driving shaft, a stop for the driving shaft, and means controlled by the movement of the carriage for operating said clutch mechanism and stop, to stop the screw and the driving shaft at prescribed positions.

46. The combination of a carriage, cutting mechanism mounted upon the carriage for movement relative to the carriage, means for advancing the carriage and for operating the cutting mechanism, clutch mechanism for registering and driving said advancing and operating means in prescribed relation, and stop devices for operating the clutch mechanism to stop the carriage and cutting mechanism at prescribed positions.

47. The combination of a carriage, cutting mechanism mounted upon the carriage for movement relative to the carriage, means for advancing the carriage and operating the cutting mechanism in alternate succession, a single-position driving clutch, a single-position stop device, and means for connecting and operating the clutch and stop devices in prescribed time relation to each other, whereby the releasing of the clutch is immediately followed by the positive stopping of the cutting mechanism and the driving engagement of the clutch is immediately preceded by the release of the stop device.

48. The combination of a carriage, cutting mechanism mounted upon the carriage for transverse movement relative to the carriage, means for advancing the carriage, operating means for effecting the said transverse movement of the cutting mechanism, mechanism for driving said advancing and operating means, and means for disconnecting the said driving mechanism to stop the carriage advance without stopping the transverse movement of the cutting mechanism.

49. The combination of a carriage, cutting mechanism mounted upon the carriage for transverse movement relative to the carriage, operating means for advancing the carriage, means for effecting the said transverse movement of the cutting mechanism, means including clutch mechanism for driving said advancing and operating means in prescribed relation, and means for disconnecting the carriage advancing means, to effect the transverse movement of the cutting mechanism without advancing the carriage.

50. The combination of a carriage, cutting mechanism mounted upon the carriage for movement relative to the carriage, means, including clutch mechanism for intermittently advancing the carriage in prescribed relation to the cutting operations, means for returning the carriage, and means, including clutch mechanism having two phases of movement, one for disconnecting the advancing movement of the carriage, and the other for inaugurating the return movement, whereby the advancing movement of the carriage may be stopped without returning it during the continued movement of the cutting mechanism.

51. The combination of a carriage, cutting mechanism mounted upon the carriage for movement relative to the carriage, means for advancing the carriage and for operating the cutting mechanism in a prescribed relation, means for returning the carriage, means, including clutch mechanism having two phases of movement, one for disconnecting the advancing movement and the other for inaugurating the return movement of the carriage, a reversing lever for effecting the two-phase movement of the clutch mechanism, and means for latching the lever in each phase position.

52. The combination in a gasket cutting machine, of driving and stop mechanism including a shaft, a ratchet wheel, a coöperating driving pawl for the ratchet, means for operating the pawl and ratchet to advance the shaft, and means for retracting the pawl from engagement with the ratchet to stop the shaft.

53. The combination in a gasket cutting machine, of driving and stop mechanism, including a shaft, a ratchet secured to the shaft, a pawl, means for reciprocating the pawl to advance the ratchet and its shaft, and means for moving the pawl out of engaging relation to the ratchet, to stop the rotating movements of the shaft, without necessarily stopping the reciprocation of the pawl.

54. The combination in a gasket cutting machine, of driving and reversing mechanism, including a shaft, a ratchet, a pawl coacting with the ratchet to rotate the shaft in one direction, and clutch mechanism mounted for engagement with the shaft to rotate it in the reverse direction, and means for moving the pawl out of engaging relation to the ratchet in advance of engaging the clutch for the reversing movement.

55. The combination of a carriage, means including clutch mechanism for advancing the carriage by a step by step movement, means including clutch mechanism for returning the carriage by continuous movement, and interlocking means for preventing one clutch mechanism from being thrown into operation while the other clutch mechanism is in operation.

56. The combination of a carriage, means including clutch mechanism for advancing the carriage in one direction by a step by step movement, means also including clutch mechanism, for returning the carriage by continuous movement, and interlocking devices coacting with the two clutch mechanisms to prevent the driving engagement of one while the other is in driving engagement.

57. The combination of a carriage, means including clutch mechanism for advancing the carriage in one direction by a step by step movement, means also including clutch mechanism for returning the carriage by a continuous movement, and interlocking devices coacting with and controlled by the respective clutch mechanisms to mutually prevent either clutch mechanism from being put into driving operation while the other clutch mechanism is in driving operation.

58. The combination of a carriage, means including clutch mechanism for advancing the carriage intermittently, means also including clutch mechanism for returning the carriage by continuous movement, and interlocking devices mutually coacting between the two mechanisms to prevent the driving operation of either of them while the other is in driving operation.

59. The combination of a carriage, means including clutch mechanism for advancing the carriage intermittently, means also including clutch mechanism for returning the carriage by faster continuous movement, interlocking members appurtenant to the respective clutch mechanisms and coacting with each other to prevent the driving engagement of one clutch mechanism while the other clutch mechanism is in driving engagement.

60. In a gasket cutting machine, the combination of a tube carrying mandrel, a carriage provided with cutting mechanism for separating the gaskets, means for intermittently advancing the carriage from one cutting position to another, and means including ratchet wheels provided with differing numbers of teeth for varying the distance between the said cutting positions.

61. In a gasket cutting machine, the combination of a rotating tube mandrel, a carriage provided with cutting mechanism for severing the respective gaskets from the tube, ratchet and pawl mechanism for advancing the carriage from one cutting position to another, and means including a plurality of interchangeable ratchets provided with differing numbers of teeth for varying the extent of the advance movements of the carriage to vary the thickness of the gaskets.

62. In a gasket cutting machine, the combination of a rotating tube mandrel, a carriage provided with cutting mechanism for severing the gaskets from the tube, means including a feed screw for intermittently advancing the carriage to move it to its successive cutting positions, and ratchet and pawl mechanism for rotating the feed screw to differing extents for gaskets of differing thickness, including a plurality of ratchets having differing numbers of teeth and interchangeably secured to the feed screw.

63. The combination, in a gasket cutting machine, of an arbor supported for rotation, a plurality of tube carrying shells interchangeably fitted to the said arbor, and means for removably securing the said shells to the said arbor.

64. In a gasket cutting machine, the combination of an arbor mounted for rotation, a plurality of tube carrying shells interchangeably fitting the arbor, means for removably securing the said shells upon the said arbor, and means for cutting annular rings from tubes carried by the said shells.

65. In a gasket cutting machine, the combination of a cutting tool, a tube supporting spindle mounted for rotation, a plurality of tube-carrying shells removably mounted upon the spindle and provided with grooves spaced in accordance with the respective widths of the gasket to be cut.

66. The combination, with a work carrying spindle, of a work cutter, and means for effecting a compound relative movement of the spindle and cutter in the direction of the axis of the spindle, and in a direction at an acute angle to that axis.

67. The combination, with a work carrying spindle, of a work cutter, means for effecting relative movement of the spindle and the cutter in the direction of the axis of the spindle, alternating with relative movement in a direction at an acute angle to that axis.

68. The combination, with a work carrying spindle, of a work cutter mounted for compound movement in the direction of the axis of the spindle, and also at an acute angle to that axis, and means for effecting the said movements alternately.

69. The combination with a work carrying spindle, of a work cutter, means for moving the cutter toward and away from the spindle by movements at an acute angle with the axis of the spindle, and means for effecting relative movement of the spindle and the cutter in a direction lengthwise of said spindle.

70. In a gasket cutting machine, the combination of a carriage, feed mechanism for moving the carriage, rotary cutting mechanism mounted on the carriage for movement at an angle to the direction of movement of the carriage, and automatic means controlled by the carriage for stopping the respective movements of the cutting and feed mechanisms at prescribed and variable positions.

71. In a gasket cutting machine, the combination of a carriage, feed mechanism for advancing the carriage in one direction by successive intermittent movements, rotary cutting mechanism mounted on the carriage, means for effecting the cutting movement of the said cutting mechanism at an angle to the advancing movement of the carriage, and means controlled by the carriage movement for stopping the respective movements of the feed mechanism and the cutting mechanism at prescribed and variable positions.

72. In a gasket cutting machine, the combination of a carriage, means for advancing the carriage by a step-by-step movement, rotary cutting mechanism mounted on the carriage, means for operating the cutting mechanism in prescribed time relative to the movements of the cutting mechanism, and automatic and variable means controlled by the carriage, for arresting its advancing movement at a predetermined position, and for stopping the cutting mechanism in a prescribed position relative to the carriage.

73. In a machine of the character specified, in combination, a tube-supporting mandrel, a rotatable knife movable toward and from said mandrel to cut rings from a tube thereon, means for effecting bodily movement of said knife toward and from said mandrel, a pivoted support for said knife, a carriage for said pivoted support and means to intermittently move said carriage longitudinally of said mandrel, substantially as described.

74. In a machine of the character described, in combination, a tube-supporting mandrel, a rotatable knife coöperating therewith to cut rings from a tube thereon, a carriage for said knife, means for automatically moving said carriage longitudinally of the said mandrel in one direction, and means for automatically releasing said carriage from its actuating means at the end of the movement of the carriage in one direction, substantially as described.

75. A ring-cutting machine, comprising a tube-supporting mandrel, a carriage mounted adjacent to and movable parallel to said mandrel, a knife-support mounted on said carriage, a rotary knife in said support, means for adjusting said support on said carriage to carry the knife toward and from the mandrel, means for adjusting the said support on the said carriage angularly with respect to the said mandrel, and means for rotating said knife.

76. The combination of a work spindle, a carriage, means for advancing the carriage longitudinally of the spindle, cutting mechanism mounted on the carriage for transverse movement toward and from the work spindle, and means controlled by the carriage for interrupting the advancing movement of the carriage at a prescribed position.

77. In a gasket cutting machine, the combination of a carriage, rotary cutting mechanism mounted on the carriage, feed mechanism for moving the carriage, and means controlled by the carriage for stopping the cutting mechanism at predetermined positions.

78. In a gasket cutting machine, the combination of a carriage, rotary cutting mechanism mounted on the carriage, feed mechanism for advancing the carriage in prescribed time relation to the operation of the cutting mechanism, and means controlled by the carriage movement for interrupting the action of the feed mechanism.

79. In a gasket cutting machine, the combination of a tube carrying mandrel, a carriage provided with cutting mechanism for separating the gaskets, means for intermittently advancing the carriage from one cutting position to the other, and means for varying the distance between the said cutting positions.

Signed at Hartford, Conn., this 9th day of February, 1907.

JOSEPH MERRITT.
WM. H. HONISS.

Witnesses:
IDA M. TOPLIFF,
CHARLES A. GOODIER.